US011234170B2

(12) United States Patent
Martin et al.

(10) Patent No.: US 11,234,170 B2
(45) Date of Patent: Jan. 25, 2022

(54) EARLY HANDOVER PREPARATION AND EARLY HANDOVER COMMAND

(71) Applicant: Convida Wireless, LLC, Wilmington, DE (US)

(72) Inventors: Brian Alexander Martin, Basingstoke (GB); Anders Berggren, Lund (SE); Vivek Sharma, Basingstoke (GB)

(73) Assignee: Convida Wireless, LLC, Wilmington, DE (US)

( * ) Notice: Subject to any disclaimer, the term of this patent is extended or adjusted under 35 U.S.C. 154(b) by 29 days.

(21) Appl. No.: 16/495,209

(22) PCT Filed: Mar. 22, 2018

(86) PCT No.: PCT/EP2018/057370
§ 371 (c)(1),
(2) Date: Sep. 18, 2019

(87) PCT Pub. No.: WO2018/172488
PCT Pub. Date: Sep. 27, 2018

(65) Prior Publication Data
US 2021/0235336 A1 Jul. 29, 2021

(30) Foreign Application Priority Data

Mar. 24, 2017 (EP) .................................... 17162884

(51) Int. Cl.
*H04W 4/00* (2018.01)
*H04W 36/00* (2009.01)
*H04W 36/08* (2009.01)

(52) U.S. Cl.
CPC ... *H04W 36/0077* (2013.01); *H04W 36/0061* (2013.01); *H04W 36/08* (2013.01)

(58) Field of Classification Search
USPC ............... 370/331, 328, 329, 330, 332, 252
See application file for complete search history.

(56) References Cited

U.S. PATENT DOCUMENTS 6,351,460 B1\* 2/2002 Tiedemann, Jr. ...... H04W 36/18
370/332
10,979,950 B2\* 4/2021 Yoon .................... H04W 36/08
(Continued)

FOREIGN PATENT DOCUMENTS

CN 101808358 A 8/2010
CN 103155682 A 6/2013
(Continued)

OTHER PUBLICATIONS

International Search Report and Written Opinion dated May 23, 2018 for PCT/EP2018/057370 filed on Mar. 22, 2018, 13 pages.
(Continued)

*Primary Examiner* — David Q Nguyen
(74) *Attorney, Agent, or Firm* — BakerHostetler

(57) ABSTRACT

A handover procedure for a terminal device in a system comprising the terminal device, a source network access node to which the terminal device is initially connected, and one or more candidate target network access nodes. The method includes determining that a first measurement for radio channel conditions for a first candidate target access node satisfies a first predefined criterion; receiving at the terminal device connection information for use by the terminal device for connecting to the first candidate target network access node; establishing a second measurement for radio channel conditions between the terminal device and one of the one or more candidate target network access nodes; determining that the second measurement of radio channel conditions satisfies a second predefined criterion; and transmitting from the terminal device an indication that the second measurement of radio channel conditions for the first candidate target network access node satisfies the second predefined criterion.

11 Claims, 5 Drawing Sheets

(56) References Cited

U.S. PATENT DOCUMENTS

| | | | | |
|---|---|---|---|---|
| 2011/0096692 A1* | 4/2011 | Liu | ............... | H04W 36/30 370/252 |
| 2011/0206006 A1* | 8/2011 | Chindapol | ............ | H04W 36/38 370/331 |
| 2013/0010763 A1* | 1/2013 | Chen | ............... | H04L 5/001 370/331 |
| 2014/0328327 A1* | 11/2014 | Xiao | ............... | H04W 36/30 370/332 |
| 2016/0113023 A1* | 4/2016 | Zhou | ............... | H04W 76/30 370/329 |

FOREIGN PATENT DOCUMENTS

| | | | | |
|---|---|---|---|---|
| CN | 103220704 A | | 7/2013 | |
| CN | 105208612 A | | 12/2015 | |
| WO | WO-2012003717 A1 | * | 1/2012 | ............ H04W 24/00 |
| WO | 2014/035304 A1 | | 3/2014 | |
| WO | 2016/062345 A1 | | 4/2016 | |
| WO | 2017/161479 A1 | | 9/2017 | |
| WO | 2018/127389 A1 | | 7/2018 | |
| WO | 2018/172488 A1 | | 9/2018 | |

OTHER PUBLICATIONS

Himke Van Der Velde, "Control Plane Protocols", LTE—The UMTS Long Term Evolution: From Theory to Practice, John Wiley & Sons, Ltd. 2009, pp. 51-78.

ZTE Corporation, "Performance Analysis on Early HO Preparation and Early HO CMD", 3GPP TSG-RAN WG2 Meeting No. 83 R2-132375, Barcelona, Spain, Aug. 19-23, 2013, 8 pages.

Alcatel-Lucent (Rapporteur), "Report of email discussion [82#16] [LTE/Het-Net] Mobility Robustness", 3GPP TSG-RAN WG2 No. 83 R2-132990, Barcelona, Spain, Aug. 19-23, 2013, 40 pages.

ZTE Corporation et al., "Analysis on Updated Early HO CMD solution", 3GPP TSG-RAN WG2 Meeting No. 83BIS R2-133147, Ljubljana, Slovenia, Oct. 7-11, 2013, 8 pages.

Ericsson, "Conditional Handover", 3GPP TSG-RAN WG2 No. 97 Tdoc R2-1700864 (Update of R2-1700544), Athens, Greece, Jan. 13-17, 2017, pp. 1-5.

Sony, "Early Handover Trigger", 3GPP TSG RAN WG2 Meeting No. 97bis R2-1703280, Spokane, US, Apr. 3-7, 2017, 3 pages.

Holma et al., "LTE for UMTS OFDMA and SC-FDMA Based Radio Access", System Architecture Based on 3GPP SAE, pp. 25-27.

3GPP, "LTE; Evolved Universal Terrestrial Radio Access (E-UTRA) and Evolved Universal Terrestrial Radio Access Network (E-UTRAN); Overall description; Stage 2", 3GPP TS 36.300 version 13.2.0 Release 13, ETSI TS 136 300 V13.2.0, Jan. 2016, pp. 1-298.

Sony, "Early Handover solutions", 3GPP TSG RAN WG2 NR Ad Hoc R2-1700142, Spokane, USA, Jan. 17-19, 2017, 4 pages.

Ericsson, "Conditional Handover", 3GPP TSG-RAN WG2 NR Ad Hoc Tdoc R2-1700544, Spokane, USA, Jan. 17-19, 2017, pp. 1-4.

3GPP, "5G; Study on Scenarios and Requirements for Next Generation Access Technologies", 3GPP TR 38.913 version 14.2.0 Release 14, ETSI TR 138 913 V14.2.0, May 2017, pp. 1-40.

Sony, "Scenarios and Operation of Mobility Using Uplink Measurements", 3GPP TSG RAN WG2 Meeting No. 96 R2-168558, Reno, USA, Nov. 14-18, 2016, 5 pages.

ETSI MCC, "Skeleton report", 3GPP TSG-RAN WG2 Meeting No. 96, Reno, USA, Nov. 14-18, 2016, pp. 1-119.

NTT Docomo, "Revision of SI: Study on New Radio Access Technology", 3GPP TSG RAN Meeting No. 72 RP-161214, Busan, Korea, Jun. 13-16, 2016, 8 pages.

* cited by examiner

EARLY HANDOVER PREPARATION AND EARLY HANDOVER COMMAND

CROSS-REFERENCE TO RELATED APPLICATIONS

The present application is based on PCT filing PCT/EP2018/057370, filed Mar. 22, 2018, which claims priority to EP 17162884.5, filed Mar. 24, 2017, the entire contents of each are incorporated herein by reference.

BACKGROUND

Field

The present disclosure relates to telecommunications apparatus and methods.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance. Other types of device, for example supporting high-definition video streaming, may be associated with transmissions of relatively large amounts of data with relatively low latency tolerance. Yet other types of device, for example used for autonomous vehicle communications, may be characterised by data that should be transmitted through a network with very low latency and very high reliability. A single device type might also be associated with different data traffic profiles/characteristics depending on the application(s) it is running. For example, different consideration may apply for efficiently supporting data exchange with a smartphone when it is running a video streaming application (high downlink data) as compared to when it is running an Internet browsing application (sporadic uplink and downlink data) or being used for voice communications by an emergency responder in an emergency scenario.

The introduction of new radio access technology (RAT) systems/networks therefore gives rise to new challenges for providing efficient operation for devices operating in new RAT networks, including devices able to operate in both new RAT networks (e.g. a 3GPP 5G network) and currently deployed RAT networks (e.g. a 3GPP 4G network).

One particular area where new approaches may be helpful is in relation to handovers between network nodes responsible for communicating with a terminal device, which may be referred to as mobility management. It will be appreciated handovers may result from a device physically moving between coverage areas of different cells or from changing radio conditions associated with different cells for a static device, and the term mobility management may be used for both scenarios.

In view of the above, there is a desire for new approaches for handling mobility in wireless telecommunications systems.

SUMMARY

The present disclosure can help address or mitigate at least some of the issues discussed above.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DESCRIPTION OF EXAMPLE EMBODIMENTS

Figure 1:
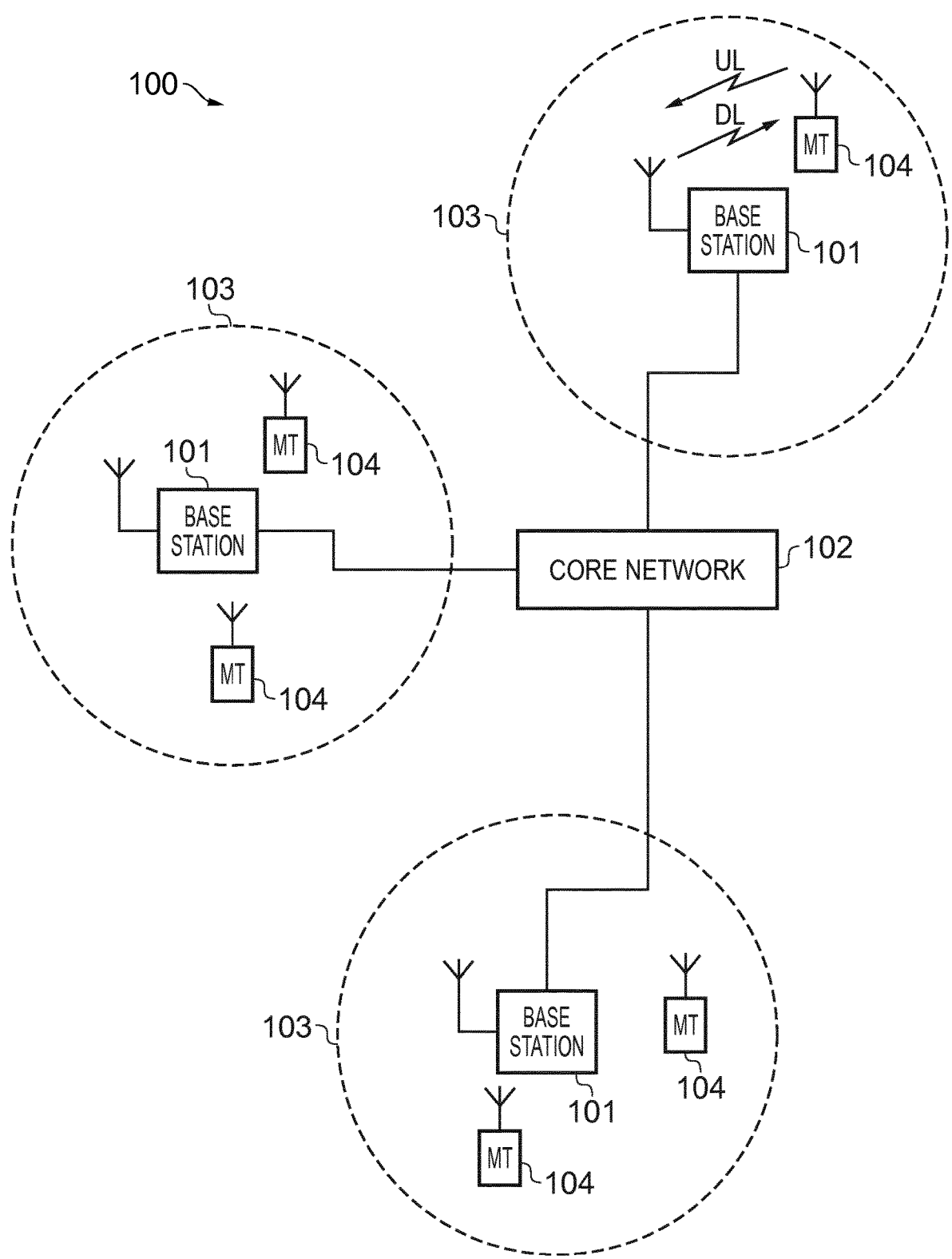
FIG. 1 schematically represents some aspects of a LTE-type wireless telecommunication network which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [1]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The core network 102 routes data to and from the terminal devices 104 via the respective base stations 101 and provides functions such as authentication, mobility management, charging and so on. Terminal devices may also be referred to as mobile stations, user equipment (UE), user terminal, mobile radio, communications device, and so forth. Base stations, which are an example of network infrastructure equipment/network access node, may also be referred to as transceiver stations/nodeBs/e-nodeBs, g-nodeBs and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity particular terminology may be used regardless of the underlying network architecture. That is to say, the use of a specific term in relation to certain example implementations is not intended to indicate these implementations are limited to a certain generation of network that may be most associated with that particular terminology.

Figure 2:
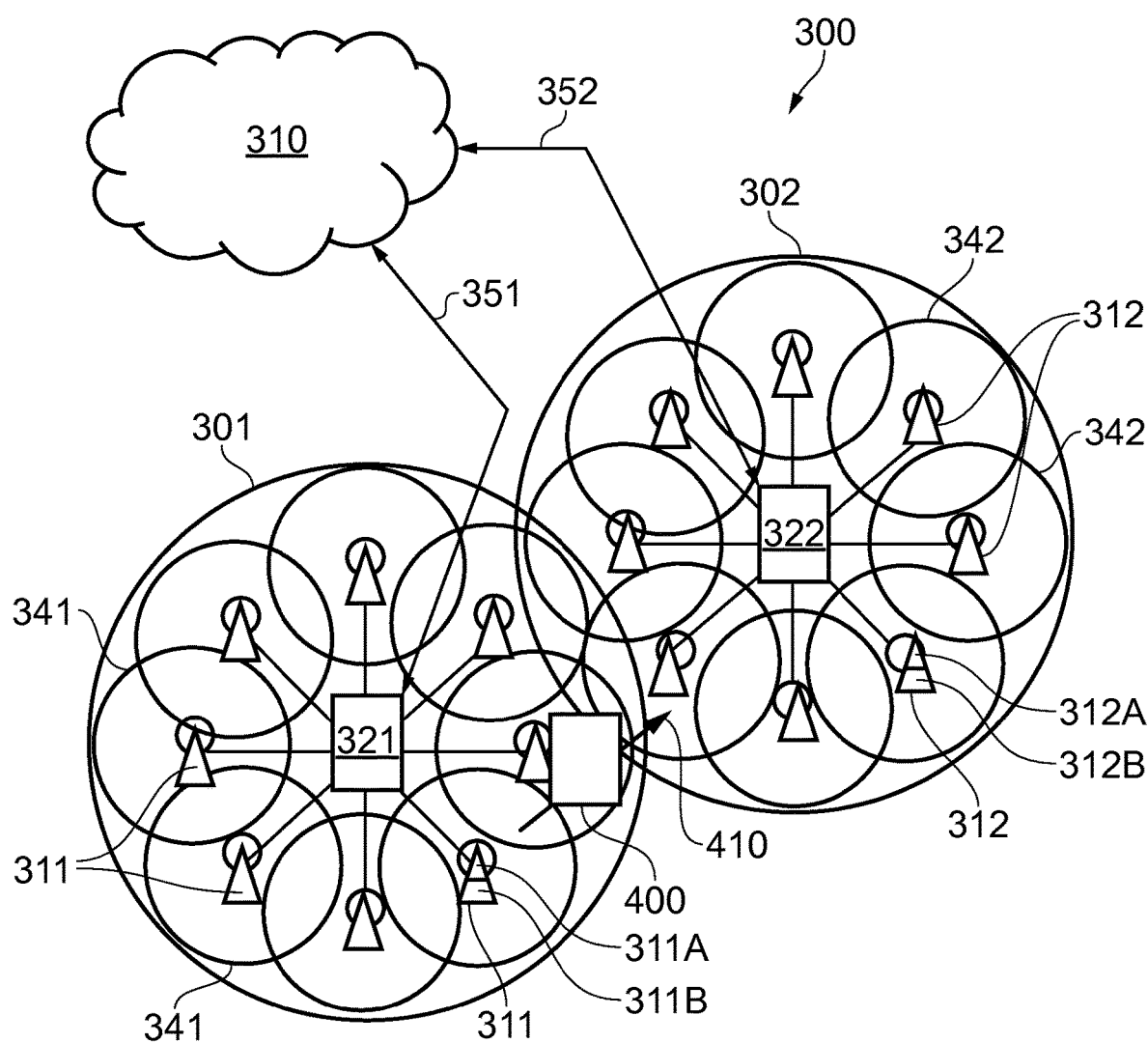
FIG. 2 schematically represents some aspects of a new radio access technology (RAT) wireless telecommunications network which may be configured to operate in accordance with certain embodiments of the present disclosure.

FIG. 2 is a schematic diagram illustrating a network architecture for a new RAT wireless mobile telecommunications network/system 300 based on previously proposed approaches which may also be adapted to provide functionality in accordance with embodiments of the disclosure described herein. The new RAT network 300 represented in FIG. 2 comprises a first communication cell 301 and a second communication cell 302. Each communication cell 301, 302, comprises a controlling node (centralised unit) 321, 322 in communication with a core network component 310 over a respective wired or wireless link 351, 352. The respective controlling nodes 321, 322 are also each in communication with a plurality of distributed units (radio access nodes/remote transmission and reception points (TRPs)) 311, 312 in their respective cells. Again, these communications may be over respective wired or wireless links.

The distributed units 311, 312 are responsible for providing the radio access interface for terminal devices connected to the network. Each distributed unit 311, 312 has a coverage area (radio access footprint) 341, 342 which together define the coverage of the respective communication cells 301, 302.

In terms of broad top-level functionality, the core network component 310 of the new RAT telecommunications system represented in FIG. 2 may be broadly considered to correspond with the core network 102 represented in FIG. 1, and the respective controlling nodes 321, 322 and their associated distributed units/TRPs 311, 312 may be broadly considered to provide functionality corresponding to base stations of FIG. 1. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the terminal devices may lie with the controlling node/centralised unit and/or the distributed units/TRPs.

A terminal device 400 is represented in FIG. 2 within the coverage area of the first communication cell 301. This terminal device 400 may thus exchange signalling with the first controlling node 321 in the first communication cell via one of the distributed units 311 associated with the first communication cell 301. In some cases communications for a given terminal device are routed through only one of the distributed units, but it will be appreciated in some other implementations communications associated with a given terminal device may be routed through more than one distributed unit, for example in a soft handover scenario and other scenarios. The particular distributed unit(s) through which a terminal device is currently connected through to the associated controlling node may be referred to as active distributed units for the terminal device. Thus the active subset of distributed units for a terminal device may comprise one or more than one distributed unit (TRP). The controlling node 321 is responsible for determining which of the distributed units 311 spanning the first communication cell 301 is responsible for radio communications with the terminal device 400 at any given time (i.e. which of the distributed units are currently active distributed units for the terminal device). Typically this will be based on measurements of radio channel conditions between the terminal device 400 and respective ones of the distributed units 311. In this regard, it will be appreciated the subset of the distributed units in a cell which are currently active for a terminal device will depend, at least in part, on the location of the terminal device within the cell (since this contributes significantly to the radio channel conditions that exist between the terminal device and respective ones of the distributed units).

In at least some implementations the involvement of the distributed units in routing communications from the terminal device to a controlling node (controlling unit) is transparent to the terminal device 400. That is to say, in some cases the terminal device may not be aware of which distributed unit is responsible for routing communications between the terminal device 400 and the controlling node 321 of the communication cell 301 in which the terminal device is currently operating. In such cases, as far as the terminal device is concerned, it simply transmits uplink data to the controlling node 321 and receives downlink data from the controlling node 321 and the terminal device has no awareness of the involvement of the distributed units 311. However, in other embodiments, a terminal device may be aware of which distributed unit(s) are involved in its communications. Switching and scheduling of the one or more distributed units may be done at the network controlling node based on measurements by the distributed units of the terminal device uplink signal or measurements taken by the terminal device and reported to the controlling node via one or more distributed units In the example of FIG. 2, two communication cells 301, 302 and one terminal device 400 are shown for simplicity, but it will of course be appreciated that in practice the system may comprise a larger number of communication cells (each supported by a respective controlling node and plurality of distributed units) serving a larger number of terminal devices.

It will further be appreciated that FIG. 2 represents merely one example of a proposed architecture for a new RAT telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1 and 2. It will thus be appreciated the specific wireless telecommunications architecture in any given implementation is not of primary significance to the principles described herein. In this regard, certain embodiments of the disclosure may be described generally in the context of communications between network infrastructure equipment/access nodes and a terminal device, wherein the specific nature of the network infrastructure equipment/access node and the terminal device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment may comprise a control unit/controlling node 321, 322 and/or a TRP 311, 312 of the kind shown in FIG. 2 which is adapted to provide functionality in accordance with the principles described herein.

As mentioned above, certain embodiments of the disclosure are directed to new approaches for handling mobility in wireless telecommunications systems. Certain embodiments are in particular concerned with handling mobility for terminal devices in a connected radio resource control state (RRC_CONNECTED state).

As is well understood, various wireless telecommunications networks, such as LTE-based networks, support different Radio Resource Control (RRC) modes for terminal devices, typically including: (i) RRC idle mode (RRC_IDLE); and (ii) RRC connected mode (RRC_CONNECTED). Generally speaking, in RRC connected mode a terminal device is connected to a base station (or other network access node depending on the specific network architecture) in the sense of being able to receive user plane data from the base station. Conversely, in RRC idle mode a terminal device is not connected to a base station in the sense of not being able to receive user plane data from the base station. In idle mode the terminal device may still receive some communications from base stations, for example reference signalling for cell reselection purposes and other broadcast signalling. The RRC connection setup procedure of going from RRC idle mode to RRC connected mode may be referred to as connecting to a cell/base station.

Figure 3:
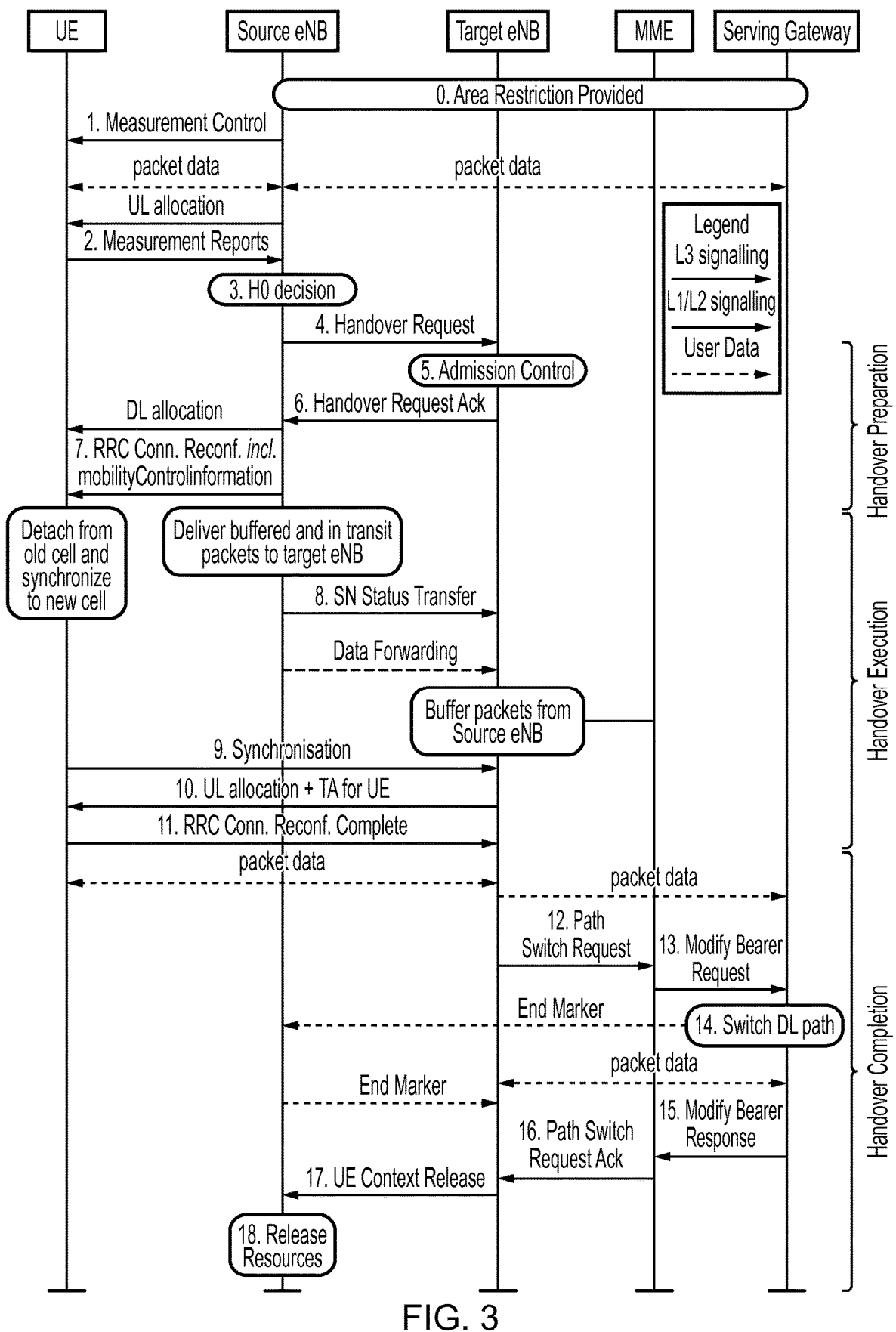
FIG. 3 is a signalling ladder diagram schematically representing aspects of a known handover procedure.

FIG. 3 is a ladder diagram showing signalling exchange between an RRC connected mode terminal device ("UE"), a source network access node ("Source eNB"), a target network access node ("target eNB"), a mobility management entity ("MME") and a serving gateway ("Serving Gateway") for a conventional Intra-MME/Serving gateway LTE handover procedure in a conventional LTE-based wireless telecommunications network. This procedure is well established and well understood and described in the relevant standards, for example, see ETSI TS 136 300 V13.2.0 (2016-01)/3GPP TS 36.300 version 13.2.0 Release 13 [2] (in particular Section 10.1), and so is not described in detail herein in the interest of brevity.

In known LTE-based wireless telecommunication systems, a terminal device in RRC CONNECTED mode/state is generally configured with event-based report triggering criteria. Thus the terminal device is configured by the network access node to which it is currently connected (the source network access node) to make measurements of radio channel conditions associated with radio paths between the terminal device and the source network access node and neighbouring access nodes (potential target network access nodes for handover). This configuration process is schematically represented in FIG. 3 by the step labelled "1. Measurement Control". In LTE, radio channel condition measurements are based on Cell-specific Reference Signals (CRSs) transmitted by network access nodes. The CRS transmissions from a given network access node provide an indication of the identity of the network access node (based on a mapping between the resources used for CRS transmissions and a physical cell identity (PCI) for the network access node). Terminal devices are configured to measure a characteristic of the CRS received from different network access nodes, for example a reference signals received power, RSRP or a reference signal received quality, RSRQ, to establish a characteristic indication of channel quality for the different network access nodes. It is based on these measurements of channel quality that handover decisions are made.

In broad summary, the terminal device is configured to determine, on an ongoing basis, if the radio channel conditions associated with any neighbouring network access node (i.e. a network access node to which the terminal device is not currently connected) meet a predefined criterion for triggering a measurement report. If the criterion is met in respect of a given neighbouring network access node, the terminal device informs the network access node to which it is connected (source network access node) that a handover may be appropriate by sending a measurement report that indicates the predefined criterion has been met for the relevant network access node. The step of transmitting a measurement report is schematically represented in FIG. 3 by the step labelled "2. Measurement Report". Based on the measurement report, the source network access node makes a decision on whether or not to handover the terminal device to the relevant neighbouring network access node (schematically indicated in FIG. 3 by the step labelled "3. HO decision"). If the source network access node does determine the terminal device should be handed over, processing continues as set out in FIG. 3.

Handover procedures of the kind represented in FIG. 3 can be subject to some drawbacks, for example a relatively high degree of signalling overhead, delays in handover during which the terminal device cannot transmit data (because it is "between nodes"), and potential for measurement errors, e.g. due in bad radio conditions, meaning a terminal device is handed over to a network access node that cannot support the terminal device as well as the network access node to which it was previously connected.

Discussions for implementing future generation networks have considered approaches for developing existing handover schemes of the kind represented in FIG. 3. Proposals have included moving to a "make-before-break" approach (i.e. terminal device establishes a connection to target network access node before disconnecting from source network access node), use of early handover commands, zero time interruption and using uplink measurements for mobility.

Early handover command (early HO command) approaches generally involve providing a terminal device operating in a source cell (i.e. a communication cell supported by a source network access node to which the terminal device is connected) with information that will allow it to operate in a potential target cell (i.e. a communication cell supported by a potential target network access node) before a final decision to handover the terminal device from the source cell to the target cell is made. Thus if it is subsequently determined the terminal device should be handed over, the handover can be made more swiftly because the terminal device has already acquired at least some of the information needed to operate in the target cell. See, for example, the documents "Conditional handover", 3GPP TSG-RAN WG2 NR Ad Hoc Tdoc R2-1700544, Spokane, USA, 17-19 Jan. 2017 [3] and "Early Handover solutions", 3GPP TSG-RAN WG2 NR Ad Hoc Tdoc R2-1700142, Spokane, USA, 17-19 Jan. 2017 [4].

Certain embodiments of the present disclosure are directed to approaches which build on early handover command approaches.

Figure 4:
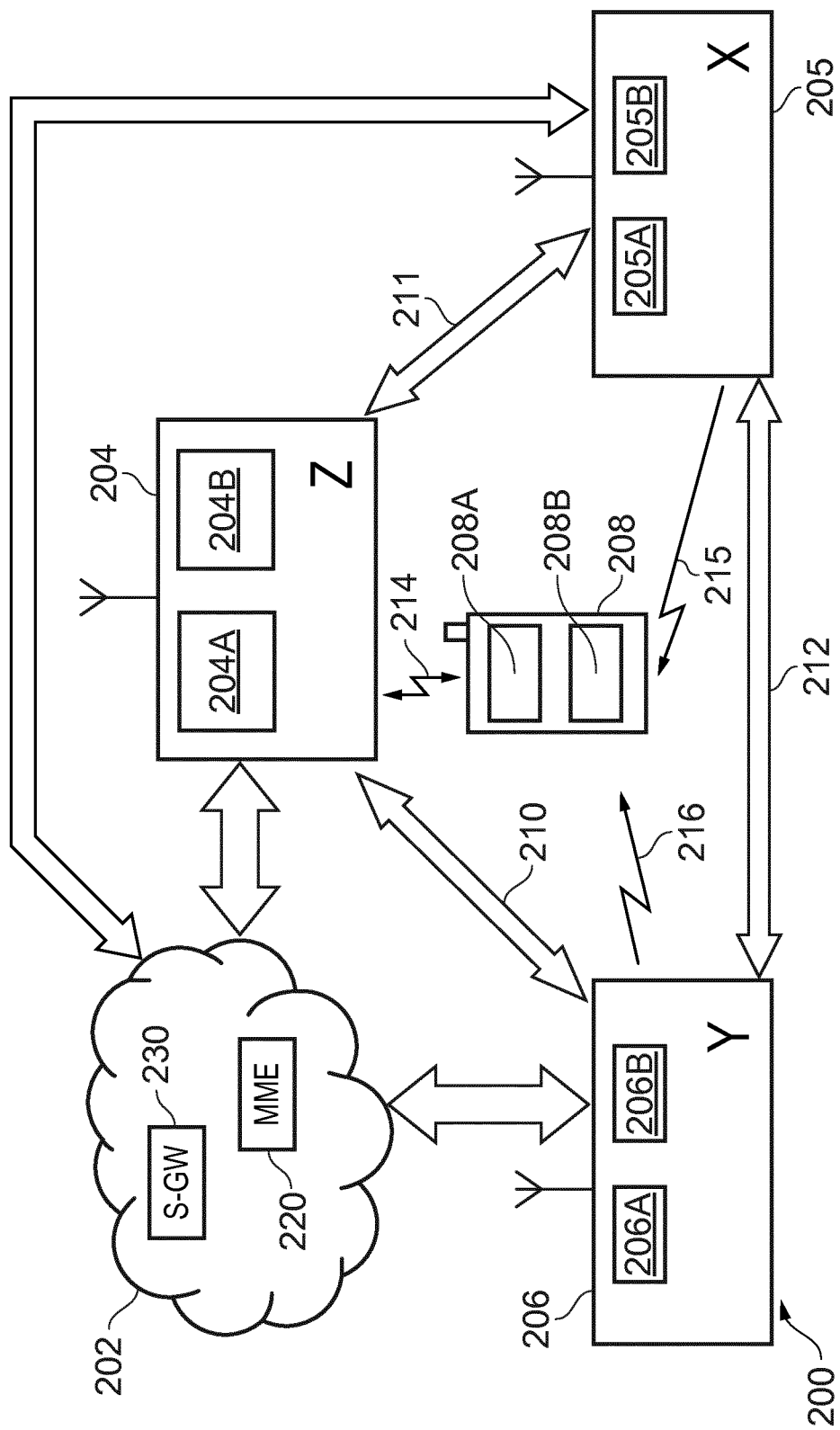
FIG. 4 schematically represents some elements of a wireless telecommunications network/system in accordance with certain embodiments of the disclosure.

FIG. 4 schematically represents some aspects of a wireless telecommunications system 200 in accordance with certain embodiments of the disclosure. The telecommunications system 200 comprises a core network part (evolved packet core) 202 coupled to a radio network part. The radio network part comprises a first network access node 204, a second network access node 205, a third network access node 206 and a terminal device 208. In this example, three network infrastructure elements/access nodes 204, 205, 206 and one terminal device 208 are shown for simplicity, but it will of course be appreciated that in practice the radio network part may comprise a larger number of network access nodes serving a larger number of terminal devices across various communication cells. Aspects of the architecture and operation of the telecommunications system 200 which are not specifically described herein may be implemented in accordance with any previously proposed techniques, for example according to current 3GPP standards and other proposals for operating wireless telecommunications systems/networks. The network access nodes 204, 205, 206 may, for convenience, sometimes be referred to herein as base stations 204, 205, 206, it being understood this term is used for simplicity and is not intended to imply the network access nodes should conform to any specific network architecture, but on the contrary, these elements may correspond with any network infrastructure equipment/network access node that may be configured to provide functionality as described herein. In that sense it will appreciated the specific network architecture in which embodiments of the disclosure may be implemented is not of primary significance to the principles described herein. In terms of terminology, it will also be appreciated that an area over which a network access node support communications with connected terminal devices is generally referred to as a communication cell, and in that regard the terms communication cell and network access node/base station may in some respects be used interchangeably. For example, when a terminal device is connected to a particular network access node, it may equally be referred to as being connected to the communication cell supported by that network access node.

As with a conventional mobile radio network, the terminal device 208 is arranged to communicate data to and from the various network access nodes (base stations/transceiver stations) 204, 205, 206. The network access nodes 204, 205, 206 are communicatively connected to a serving gateway, S-GW, 230 in the core network part 202 which is arranged to perform routing and management of mobile communications services to the terminal devices in the telecommunications system 200 via the network access nodes 204, 205, 206. In order to maintain mobility management and connectivity, the core network part 202 also includes a mobility management entity, MME, 220 which manages the enhanced packet service, EPS, connections with the terminal device 208 operating in the communications system based on subscriber information stored in a home subscriber server, HSS. Other network components in the core network in this example implementation (not shown for simplicity) include a policy charging and resource function, PCRF, and a packet data network gateway, PDN-GW, which provides a connection from the core network part 202 to an external packet data network, for example the Internet. As noted above, the operation of the various elements of the communications system 200 shown in FIG. 4 may be broadly conventional apart from where modified to provide functionality in accordance with embodiments of the present disclosure as discussed herein.

The various network access nodes are this example functionally identical. Each network access node 204, 205, 206 comprises transceiver circuitry 204a, 205a, 206a (which may also be referred to as a transceiver/transceiver unit) for transmission and reception of wireless signals and processor circuitry 204b, 205b, 206b (which may also be referred to as a processor/processor unit) configured to control the respective network access nodes to operate in accordance with embodiments of the present disclosure as described herein. The processor circuitry 204b, 205b, 206b for each network access node may comprise various sub-units for providing functionality in accordance with embodiments of the present disclosure as explained further herein. These sub-units may be implemented as discrete hardware elements or as appropriately configured functions of the processor circuitry. Thus, the processor circuitry 204b, 205b, 206b for each network access node may comprise circuitry which is suitably configured/programmed to provide the desired functionality described herein using conventional programming/configuration techniques for equipment in wireless telecommunications systems. The transceiver circuitry 204a, 205a, 206a and the processor circuitry 204b, 205b, 206b for each network access node are schematically shown in FIG. 4 as separate elements for ease of representation. However, it will be appreciated that the functionality of these circuitry elements for each network access node can be provided in various different ways, for example using one or more suitably programmed programmable computer(s), or one or more suitably configured application-specific integrated circuit(s)/circuitry/chip(s)/chipset(s). It will be appreciated the network access nodes 204, 205, 206 will in general comprise various other elements associated with their operating functionality, such as a scheduler. For example, although not shown in FIG. 4 for simplicity, the processor circuitry for the respective network access nodes may comprise scheduling circuitry, that is to say the processor circuitry may be configured/programmed to provide the scheduling function for each of the network access nodes.

The terminal device 208 is adapted to support operations in accordance with embodiments of the present disclosure when communicating with the network access nodes 204, 205, 206. The terminal device 208 comprises transceiver circuitry 208a (which may also be referred to as a transceiver/transceiver unit) for transmission and reception of wireless signals and processor circuitry 208b (which may also be referred to as a processor/processor unit) configured to control the terminal device 208. The processor circuitry 208b may comprise various sub-units/sub-circuits for providing functionality in accordance with embodiments of the present disclosure as described herein. These sub-units may be implemented as discrete hardware elements or as appropriately configured functions of the processor circuitry. Thus the processor circuitry 208b may comprise circuitry which is suitably configured/programmed to provide the desired functionality described herein using conventional programming/configuration techniques for equipment in wireless telecommunications systems. The transceiver circuitry 208a and the processor circuitry 208b are schematically shown in FIG. 4 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). It will be appreciated the terminal device 208 will in general comprise various other elements associated with its operating functionality, for example a power source, user interface, and so forth, but these are not shown in FIG. 4 in the interests of simplicity.

To facilitate an explanation of approaches in accordance with certain embodiments of the disclosure, a particular operating scenario for the wireless telecommunications system 200 represented in FIG. 4 will be considered. In particular, it will be assumed the terminal device 208 is RRC connected to the first network access node 204 and in sufficient proximity to the second network access node 205 and the third network access node 206 that these represent potential target network access nodes to which the terminal device might be handed over. In this regard, the first network access node 204 may also be referred to as the source network access node 204, the second network access node 205 may also be referred to as the first candidate target network access node 205, and the third network access node 206 may also be referred to as the second candidate target network access node 206.

Thus for the example implementation scenario represented in FIG. 4 it is assumed the terminal device 208 is communicating with (connected to) the source network access node 204 over a radio path 214 and is in a location in which it receives reference signalling available for handover evaluation from the first candidate target network access node 205 over radio path 215 and from the second candidate target network access node 206 over radio path 216. The respective network access nodes are able to communicate with one another over respective communication links 210, 211, 212 are schematically represented in FIG. 4. In some network architectures the network nodes may communicate directly with one another, as schematically represented in FIG. 4, while in other network architectures they may communicate with one another indirectly via the core network part 202.

To broadly summarise approaches in accordance with certain embodiments of the disclosure a terminal device connected to a source network access node is configured to measure radio channel conditions associated with neighbouring network access nodes (potential/candidate target network access nodes). The terminal device determines if a first criterion is met in respect of radio channel conditions associated with one (or more) of the candidate target network access nodes, and if so transmits a measurement report indicating this to the source network access node. The first criterion may correspond with existing event triggers associated with known handover procedures. For example the first criterion may be satisfied if measurements of a quality characteristic associated with radio channel conditions for a candidate target network access node indicate the radio channel conditions for the candidate target network access node are better than a predefined threshold or better than current radio channel conditions for the source network access node by at least a predefined threshold. The quality characteristic may, for example, be based on a reference signal received power, RSRP, or reference signal received quality, RSRQ, for CRS transmitted by the candidate target network access node).

On receiving the measurement report indicating the radio channel conditions for a radio path between the terminal device and a candidate target network access node satisfy the first predefined criterion, the source network access node exchanges signalling with the candidate target network access node to establish connection information that the terminal device can use to access/connect to the candidate target network access node. The source network access node transmits an indication of this connection information for the candidate target network access node to the terminal device in an early handover command. The indication of the connection information may, for example, include configuration information for the relevant candidate target cell.

The terminal device receives and stores the connection information for the candidate target network access node. However, in accordance with certain embodiments of the disclosure, the terminal device does not seek to initiate a handover connection to the candidate target network access node until it is determined from further measurements of channel conditions associated with the candidate target network access node that a second criterion is met in respect of radio channel conditions associated with the candidate target network access node for which the terminal device has previously received connection information in an early handover command.

If the terminal device determines that the second criterion is met in respect of radio channel conditions associated with a candidate target network access node for which the terminal device has previously received and still has stored connection information, the terminal device transmits a second measurement report to indicate this to the source network access node. It will be appreciated that in some example implementations the terminal device need not send a measurement report in the sense of providing the source network access node with an indication of the relevant measurement results themselves, but may instead simply send a signal to indicate the relevant criterion has been met so as to trigger the handover at the source network access node.

On receiving the second measurement report from the terminal device, the source network access node determines that handover should be activated, and transmit a handover command to the terminal device. The handover command may be simplified in that the terminal device has already been provided with relevant connection information (access information) in the early handover command transmitted from the source network access node to the terminal device in response to the measurement report indicating the first criterion had been satisfied in respect of radio channel conditions for the relevant candidate target network access node.

On receiving the simplified handover command, the terminal device may complete the handover procedure and transmit handover complete signalling to the relevant candidate target network access node.

Figure 5:
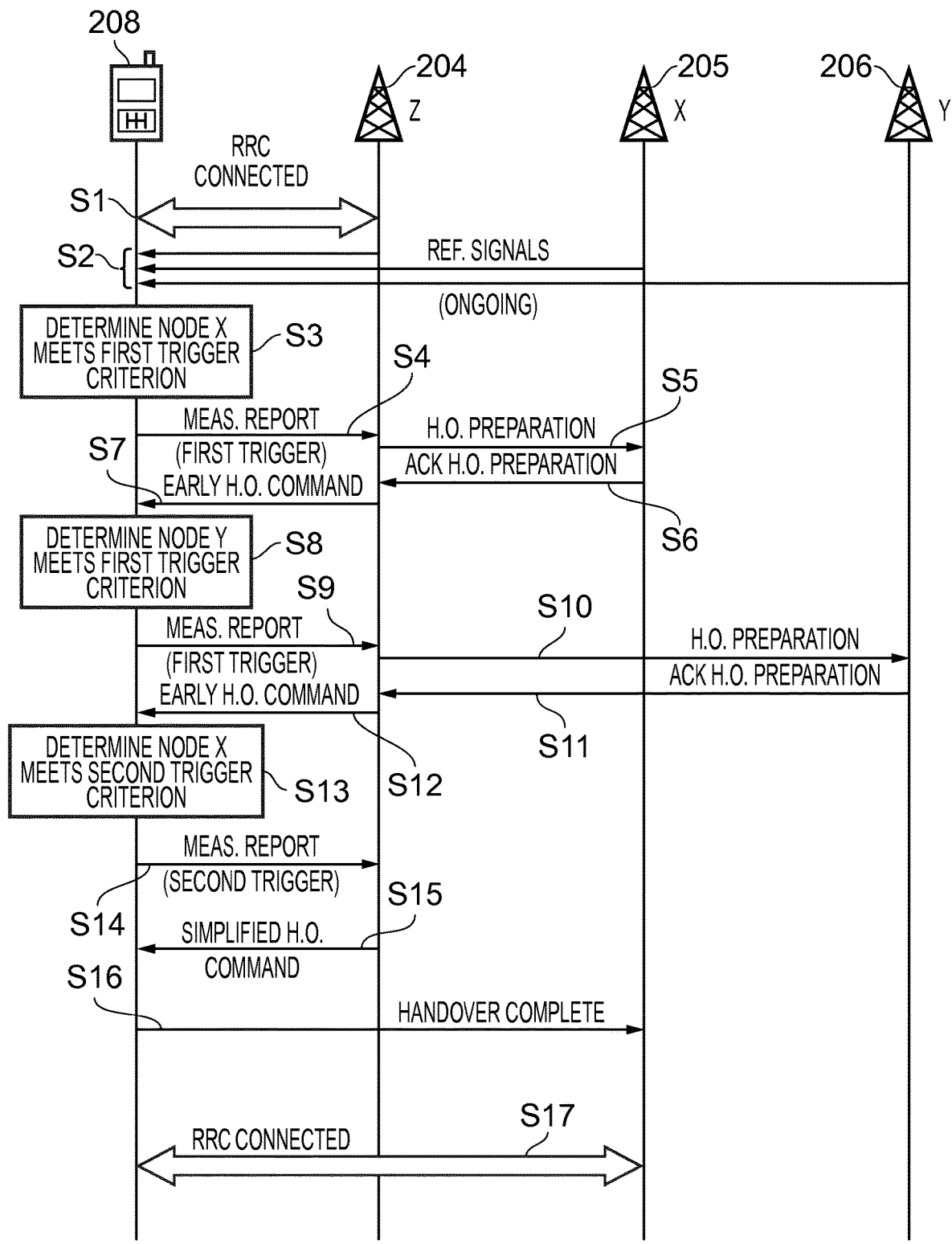
FIG. 5 is a ladder diagram schematically representing some operating aspect of wireless telecommunications networks/systems in accordance with certain embodiments of the disclosure.

FIG. 5 is a ladder diagram schematically representing some operating aspects of the wireless telecommunications system 200 of FIG. 4 in accordance with certain embodiments of the disclosure. In particular, the diagram represents some operations and signalling exchange associated with the terminal device 208, the source network access node 204, the first candidate target network access node 205 and the second candidate target network access node 206 in accordance with certain embodiments of the disclosure. For simplicity of terminology, the source network access node 204 may sometimes be referred to as node Z, the first candidate target network access node 205 may sometimes be referred to as node X and the second candidate target network access node 206 may sometimes be referred to as node Y.

The processing represented in FIG. 5 starts in step S1 in which it is assumed the terminal device 208 is active on node Z (i.e. the terminal device is RRC connected to node Z).

While the terminal device is connected to node Z, it monitors cell specific reference signals from node Z and neighbouring nodes X and Y, as schematically represented in step S2. Based on the cell specific reference signals associated with the different network access nodes, the terminal device establishes measurement of radio channel conditions associated with radio paths between the terminal device and the respective access nodes. This measurement of radio channel conditions may, for example, comprise measurements of reference signal received power, RSRP, and/or reference signal received quality, RSRQ. In general, the process of establishing measurements of radio channel conditions between the terminal device and the different network access nodes may be performed in accordance with conventional techniques. Furthermore, it will be appreciated that while FIG. 5 schematically represents reference signals being transmitted only once (in step S2), in practice, and as is well established, reference signals will be transmitted on an ongoing/continuous basis throughout the processing represented in FIG. 5. That is to say, at different stages in the processing represented in FIG. 5 the terminal device is able to establish current radio channel conditions from the latest of the ongoing reference signal transmissions from the respective network access nodes. The terminal device may be configured to perform these neighbour cell measurements in accordance with conventional techniques. It will be appreciated the use of cell-specific reference signals is merely one example and other forms of reference/beacon signalling may be used to establish a measurement of channel conditions in different implementations.

In step S3 of the processing represented in FIG. 5 it is assumed that a measurement event is triggered in respect of node X. That is to say, it is assumed the terminal device 208 determines the radio channel conditions associated with node X satisfy a predefined first trigger criterion. This may be, for example, because the terminal device is moving towards node X so that the path loss between node X and the terminal device is decreasing, thereby improving radio channel conditions until they become good enough to meet the predefined trigger criterion. The specific trigger criterion may be different for different implementations, and may, in general, be based on existing trigger criteria in wireless telecommunication systems. In the context of a generally LTE-based wireless telecommunications system, established measurement events/trigger criteria include:

Event A1—Serving cell (i.e. the cell supported by the current source network access node) becomes better than threshold (which may be used to stop the process of the serving cell seeking an alternative better-performing cell);

Event A2—Serving cell becomes worse than threshold (which may be used to start the process of the serving cell looking for an alternative better-performing cell);

Event A3—Neighbour cell (i.e. a cell supported by a candidate target network access node) becomes better than serving cell Event A4—Neighbour cell becomes better than threshold Event A5—Serving cell becomes worse than a first threshold and neighbour cell becomes better than a second threshold Event A6—Neighbour cell becomes offset better than secondary cell (any or all of which may be used for deciding on handovers or activation/deactivation of carriers);

Event B1—Inter RAT (radio access technology) neighbour cell becomes better than threshold Event B2—Serving cell becomes worse than a first threshold and inter RAT neighbour cell becomes better than a second threshold (either of which may be used for deciding on handovers between different operating technologies).

For the sake of this example, it will be assumed the first predefined criterion satisfied in step S3 is associated with a measurement event A3, i.e. a determination that current radio channel conditions associated with node X (the first candidate target network access node 205) are better than radio channel conditions associated with node Z (serving network access node 204) by at least a first threshold amount. The first threshold amount may also be referred to as a first offset (offset 1).

In response to determining the measurement event is triggered in step S3 in respect of node X, the terminal device transmits a measurement report to indicate this to the source network access node (node Z), as schematically indicated in step S4. This step may in some cases be performed in accordance with conventional signalling techniques, for example an RRC report.

On receiving the measurement report from the terminal device in step S4, the source network access node 204 (node Z) starts to prepare for a potential handover by communicating with the network access node in respect of which the measurement report was triggered (in this case node X) to provide node X with configuration information relating to the terminal device, for example the terminal device context and so forth, and to receive from node X an indication of information to be used by the terminal device to connect to node X, for example information relating to radio bearer settings and a dedicated random access channel, RACH, preamble that will be reserved for the terminal device. This aspect of the processing is schematically represented in step S5 and S6 in FIG. 5 and may be based on broadly conventional techniques.

In step S7 the source network access node 204 transmits an early handover command to the terminal device 208 to provide the terminal device with an indication of connection information to be used by the terminal device for connecting to node X, for example an indication of bearer settings and dedicated random access channel, RACH, preamble. The specific information provided in the early handover command will depend on the specific implementation at hand.

After having received the connection information relating to node X in step S7, the terminal device starts to monitor for whether radio channel conditions associated with node X satisfy a second trigger criterion. This aspect of the processing may broadly correspond with step S3, but be associated with a different, higher, threshold. That is to say, this aspect of the processing may be configured to determine when the radio channel conditions associated with node X become even better than the radio channel conditions associated with the current source network access node by at least a threshold amount. While the terminal device is doing this, it is also still monitoring for whether any other candidate target network access nodes satisfy the first trigger criterion.

In this example it is assumed in Step S8 of the processing represented in FIG. 5 a measurement event is triggered in respect of node Y. In this regard, step S8 is similar to, and will be understood from, the above-description of step S3, except the measurement event triggered in step S8 is in respect of the second candidate target network access node 206 (node Y).

In response to determining the measurement event is triggered in step S8 in respect of node Y, the terminal device transmits a measurement report to indicate this to the source network access node (node Z), as schematically indicated in step S9. This step may be performed in accordance with conventional techniques.

On receiving the measurement report from the terminal device in step S9, the source network access node 204 (node Z) starts to prepare for a potential handover by communicating with the network access node in respect of which the measurement report was triggered (in this case node Y) to provide node Y with configuration information relating to the terminal device and to receive from node Y an indication of information to be used by the terminal device if it wishes to connect to node Y. This aspect of the processing is schematically represented in step S10 and S11 in FIG. 5, and these steps are similar to, and will be understood from, steps S5 and S6 discussed above, albeit in respect of a different candidate target network access node.

In step S12 the source network access node 204 transmits an early handover command to the terminal device 208 to provide the terminal device with an indication of connection information to be used by the terminal device for connecting to node Y. The indication of the connection information may, for example, include configuration information for node Y. This step is similar to, and will be understood from, the above-description of step S7, albeit in respect of a different candidate target network access node. Thus, after step S12, the terminal device has received and stored connection information in respect of both the first candidate target network access node 205 (received in step S7) and the second candidate target network access node 206 (received in step S12).

After having received the connection information relating to node Y in step S12, the terminal device starts to monitor for whether radio channel conditions associated with node Y satisfy the second trigger criterion. This aspect of the processing may broadly correspond with step S8, but be associated with a different, higher, threshold. That is to say, this aspect of the processing may be configured to determine when the radio channel conditions associated with node Y become even better than the radio channel conditions associated with the current source network access node by at least a predefined amount/offset. While the terminal device is doing this, it is also still monitoring for whether radio channel conditions associated with node X satisfy the second trigger criterion, and indeed if any other candidate target network access nodes satisfy the first trigger criterion.

In step S13 of the processing represented in FIG. 5 it is assumed that a second measurement event is triggered in respect of node X. That is to say, it is assumed the terminal device 208 determines the radio channel conditions associated with node X satisfy a predefined second trigger criterion. In this example the predefined second criterion corresponds in type with the predefined first criterion, i.e. based on event type A3, but is associated with a different, higher, threshold. That is to say, for the radio channel conditions associated with node X to satisfy the second trigger criterion in step S13, the terminal device determines that a quality characteristic associated with measurements of radio channel conditions for node X is better than a corresponding quality characteristic associated with measurements of radio channel conditions for the current serving network access node (node Z) by an amount which is higher than the amount required to satisfy the first predefined criterion in step S3. This may occur, for example, because the terminal device has continued moving towards node X so that the path loss between node X and the terminal device has continued to decrease, thereby improving radio channel conditions even further until they become good enough to meet the second predefined trigger criterion.

Thus in step S13 there is a determination that current radio channel conditions associated with node X (the first candidate target network access node 205) are better than radio channel conditions associated with node Z (serving network access node 204) by at least a second threshold amount that is greater than the first threshold amount. The second threshold amount may also be referred to as a second offset (offset 2). The difference between offset 1 and offset 2 may itself be considered and early handover offset. That is to say, offset 2 represents the level of offset required to trigger a handover, whereas the lower offset, offset 1, represents the level of offset required to provide the terminal device with advance connection information (arly handover command) in the expectation a handover may later occur when the second offset is met.

In response to determining the measurement event (second trigger criterion met) is triggered in step S13 in respect of node X, the terminal device transmits a measurement report to indicate this to the source network access node (node Z), as schematically indicated in step S14. This step may in some cases be performed in accordance with conventional signalling techniques. In some cases the measurement report (i.e. the indication a measurement of radio channel conditions for the candidate target network access node satisfies the second predefined criterion) may comprise at least one of: (i) a radio resource control message; (ii) layer two, L2, signalling, such as a medium access control, MAC, header; and (iii) layer one, L1, signalling, such as in association with a scheduling request or other control information. The message discussed above in relation to step S3 may also be sent in a similar manner.

On receiving the indication the second trigger criterion is met in respect of node X in step S14, the source network access node may determine the handover to node X should proceed, and transmit a simplified handover command to the terminal device, as schematically indicated in step S15. This handover command may be simplified inasmuch as it does not need to convey connection information needed by the terminal device to connect to the selected candidate target network access node (node X in this example) which has already been provided to the terminal device in the early handover command of step S7. The simplified handover command (i.e. the indication the terminal device should connect to the relevant target network access node) may comprise as a least one of: (i) an indication of an identifier for the first candidate target network access node; (ii) a radio resource control message; (iii) layer two, L2, signalling, such as a medium access control, MAC, control element; (iv) layer one, L1, signalling, such as a physical downlink control channel, PDCCH, order.

As schematically indicted in step S16, in response to receiving the simplified handover command in step S15, the terminal device performs the handover based on the connection information/configuration information received in the early handover command of step S7 and sends a handover complete to node X (i.e. to the selected candidate target network access node, this network access node being selected on the basis of the second trigger criterion being met while the terminal device had stored connection information for this candidate target network access node).

As schematically indicated step S17, the terminal device can thus synchronise to node X (if synchronisation is needed) and operate in an RRC connected mode with respect to node X, thereby completing the handover procedure.

Thus, in accordance with the approaches discussed herein, a terminal device is able to acquire information to help access (connect to) a candidate target network access node in response to determining radio channel conditions for that candidate target network access node meet a first criterion, but the handover process does not proceed until after the terminal device determines radio channel conditions for that candidate target network access node meet a second, higher criterion. When the second criterion is met, the handover may proceed swiftly because the terminal device already has the relevant connection information, and a short simplified handover command message may be transmitted by the source network access node to the terminal device to instruct the handover itself.

In terms of how the different measurements may be configured, in some implementations the terminal device may receive first measurement control signalling from the source network access node in accordance with broadly conventional measurement control configuration techniques. This first measurement control signalling may thus indicate the list of neighbouring access nodes the terminal device is to measure to determine if signalling associated with any of these nodes meets the first trigger criterion discussed above in relation to step S3. The terminal device will continue to make these measurements until the relevant criterion (first trigger event) is met for any of the neighbouring network access nodes for which measurements are configured (i.e. the candidate target network access nodes). When the trigger criterion is met for one of the network access nodes (e.g. in step S3 for node X and in step S8 for node Y), the terminal device transmits a measurement report to the source network access node (e.g. as in step S4 and S9 discussed above in relation to FIG. 5). On receiving a measurement report indicating measurements in respect of a given candidate target network access node have satisfied the trigger criterion, the source network access node may in some implementations be configured to send further measurement control signalling to the terminal device to configure the terminal device to make measurements of the given candidate target in respect of the second trigger criterion, which again may be in accordance with broadly conventional measurement control configuration techniques. It will be appreciated this is merely one example approach for configuring the relevant measurements. For example, in some other implementations the terminal device may only receive measurement control signalling to configure measurements relating to the first trigger criterion, and the terminal device may autonomously establish itself that it should continue to make measurements relating to the second trigger criterion in respect of candidate target network access nodes which the terminal determines have satisfied the first criterion.

It will be appreciated the description provided in relation to FIG. 5 may be modified in accordance with other implementations. For example, it may be expected there will be additional signalling exchange between the various elements present in FIG. 5 which is not included in FIG. 5 for simplicity. The example, there may be signalling exchange between node Z and node X around the same time as step S15 so that the source network access node (node Z) can provide the candidate target network access node to which the handover is to be made (node X) with further relevant data (data forwarding) to allow it to properly support the terminal device as quickly as possible.

Furthermore, it will be appreciated some of the steps represented in FIG. 5 may be avoided or combined with other steps. For example, the measurement report providing an indication the first trigger criterion is met may not be included in all implementations, and/or may be combined with the measurement report indicating the second trigger criterion is met.

In some examples, when a terminal device transmit a measurement report in respect of a measurement event for one candidate target network access node, the report may also include an indication of measurement results for other candidate target network access nodes.

It will also be appreciated the specific example represented in FIG. 5 in which the handover occurs to the first candidate target network access node 205 is merely an example of one scenario. For example, in another scenario it may be determined in step S13 that in fact it is the second candidate target network access node 206 that first meets the second criterion, so that the terminal device is subsequently handed over to the second candidate target network access node 206.

It will also be appreciated that in different implementations, different trigger criteria may be adopted. Furthermore, in the above-described example the first trigger criterion and the second trigger criterion are assumed to be based on the same quality characteristic, but using different thresholds. In other implementations the first and second quality criteria may be based on different events. Example, the first trigger criterion may be based on an radio channel conditions for a neighbouring node becoming better than radio channel conditions for a currently serving node by a threshold amount (i.e. an A3 type event), whereas the second trigger criterion may be based on radio channel conditions for a neighbouring node becoming better than a given threshold amount (i.e. an A4 type event). More generally, it will be appreciated the nature of the specific trigger events used, and the specific thresholds associated with those events, may be different in different implementations. Specific thresholds to associate with specific triggers may be determined, for example, from modelling, for example to ensure terminal devices do not receive an unduly large number of early handover commands compared to how many of these convert to actual handovers (which might occur if the threshold level associated with the first trigger event is set too low compared to the threshold level for the second trigger event).

In accordance with certain implementations the terminal device may be configured to discard stored connection information that it has previously received if it becomes apparent this information is unlikely to be needed, for example because radio channel conditions in respect of the relevant candidate target network access node for which the connection information are stored deteriorate, or there is too long a delay between the first trigger criterion being met and the second trigger criterion being met (i.e. too long a delay between steps S3 and S13 in FIG. 5).

Thus, in accordance with some examples, the terminal device may be configured to discard the stored connection information for a given candidate target network access node so that it does not go on to initiate a connection to that candidate target network access node using the stored connection information if one or more of the following conditions is met: (i) the terminal device does not determine the second trigger criterion is satisfied within a predefined validity period associated with the stored connection information; (ii) the terminal device connects to a different candidate target network access node after having stored the connection information for the given candidate target network access node; (iii) the terminal device determines the first measurement event criterion is satisfied by a different candidate target network access node after having stored the connection information for the given candidate target network access node; (iv) the terminal device receives signalling from the source network access node to indicate the terminal device should discard the stored connection information (for example because the source network access node becomes aware of the relevant candidate target network access node is no longer available to the terminal device); and (v) the terminal device determines a measurement of radio channel conditions between the terminal device and the relevant candidate target access node satisfies a third predefined criterion before the terminal device determines the second criterion is satisfied. In this regard, the third criterion might be satisfied if it is determined the measurements of radio channel conditions for the relevant candidate target network access node indicate a quality characteristic for the radio channel associated with that candidate target network access node falls below an acceptable minimum threshold (i.e. satisfying this criterion may in some respects be considered a "negative" requirement in that the criterion could also be framed as requiring the channel conditions to fail to remain above the relevant threshold). Thus, if it is determined the channel conditions associated with a candidate target network access node for which a previous early handover command has been received have deteriorated to a predefined level, the connection information received in the early handover command and stored for that network access node may be disregarded (e.g. deleted) to in effect finish the handover procedure in respect of that network access node, until it is determined the first criterion is again met for that network access node. It may be noted this approach of discarding/not using information received in a previous early handover command if the radio channel conditions associated with the candidate target base station to which the previous early handover command relates are determined to deteriorate to below a threshold amount may be adopted generally in wireless telecommunications systems, and not just systems implementing a two-stage even trigger approach to handover as discussed herein.

In addition to this, the terminal device may be configured to inform the network that this has happened, for example by sending a measurement report to the source network access node indicating the radio channel conditions for the relevant candidate target cell have deteriorated to an extent the terminal device is disregarding the relevant candidate target cell for potential handover. Based on this the source network access node may inform the relevant candidate target network access node that it is no longer be considered a handover target for the terminal device, so that it may release any resources (for example dedicated RACH resources and/or other resources reserved for bearers) that it had previously reserved for the terminal device on receiving handover preparation signalling from the source network access node.

Thus to summarise some of the principles described herein in accordance with some example embodiments, it is proposed to use Early Handover procedures and introduce a second event trigger for measurement reporting, and for a terminal device to first trigger a Handover preparation message (short measurement report) to the network, followed be a Handover execution trigger from the source eNB to the terminal device. The Handover preparation message could be sent several times and/or indicate multiple target base stations (gNB).

Some aspects of FIG. 5 in accordance with certain example imitations may be summarised as follows:

1. The UE is configured to perform neighbour cell measurements.

2. When a measurement event is triggered e.g. A3, neighbour cell becomes better than a threshold, the UE sends a measurement report to the eNB. For this trigger an "early handover offset" may be added. The offset specifies the difference between reporting criteria of the first trigger and the second trigger—so that the measurement report and early handover command can be transmitted earlier than the actual handover occurs;

3. The S-gNB starts to prepare for a potential handover by;
   a. Configuring candidate gNB's to be prepared for the handover, including UE context etc.
   b. Responds to the UE with target gNB parameter configurations etc.

4. The procedure of steps 1-3 may be repeated for any other potential candidate neighbour cell.

5. Based on a second measurement event (or a second trigger based on the offset, or a second threshold on the same measurement event), using the same or another event type, e.g. A3, neighbour cell becomes better than a threshold, the UE sends a Handover trigger to the gNB. For this event trigger a second "offset" is used, which has previously been configured. This may be a
   a. short RRC message
   b. conveyed by L2 (e.g. MAC header)
   c. L1 indication (e.g. part of scheduling request or other L1 control information)

6. The Source gNB executes the handover with a Simplified handover command, just indicating which target the UE should select. This may be
   a. a short RRC message
   b. conveyed in L2 (MAC control element/CE)
   c. L1 indication such as PDCCH order 7. The UE performs the Handover based on configuration received in the "Early HO cmd", and sends a handover complete to target eNB.

Furthermore, it is proposed in accordance with some examples that a UE may be configured with a new Measurement Event, e.g. "Neighbour cell becomes worse than a threshold", or "neighbour cell is offset by worse than a threshold", and send a Measurement report to a gNB to remove this cell/gNB from the candidate list (either using a full measurement report, or a short indication allowing early handover command to be cancelled). This will allow Source eNB to delete or cancel HO preparation as the UE moves across the network and target can release resources which will no longer be usable for this UE.

If the "second" Measurement event is not triggered within a certain time period, the Early handover configuration may be removed. The early handover configuration may be removed if the "first" measurement event is triggered for another neighbour cell. In certain cases the source eNB may finds the candidate/target gNB not available anymore, so an Early handover cancellation may be sent to the UE to indicate that no handover will be performed to previously configured Target gNB.

Thus there has been described a handover procedure for a terminal device in a wireless telecommunications system comprising the terminal device, a source network access node to which the terminal device is initially connected, and one or more candidate target network access nodes, wherein the method comprises: establishing a first measurement for radio channel conditions between the terminal device and respective one of the one or more candidate target network access nodes; determining that the first measurement for radio channel conditions for a first candidate target access node satisfies a first predefined criterion; transmitting from the terminal device to the source network access node an indication that the first measurement of radio channel conditions for the first candidate target network access node satisfies the first predefined criterion; receiving at the terminal device connection information for use by the terminal device for connecting to the first candidate target network access node; establishing a second measurement for radio channel conditions between the terminal device and respective one of the one or more candidate target network access nodes; determining that the second measurement of radio channel conditions satisfies a second predefined criterion; transmitting from the terminal device to the source network access node an indication that the second measurement of radio channel conditions for the first candidate target network access node satisfies the second predefined criterion; receiving at the terminal device an indication the terminal device should connect to the first candidate target network access node, and in response thereto, transmitting signalling from the terminal device to the first candidate target network access node to initiate a connection to the first candidate target network access node using the connection information.

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It may be noted various example approaches discussed herein may rely on information which is predetermined/predefined in the sense of being known by both the base station and the terminal device. It will be appreciated such predetermined/predefined information may in general be established, for example, by definition in an operating standard for the wireless telecommunication system, or in previously exchanged signalling between the base station and terminal devices, for example in system information signalling, or in association with radio resource control setup signalling. That is to say, the specific manner in which the relevant predefined information is established and shared between the various elements of the wireless telecommunications system is not significance to the principles of operation described herein. It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not significance to the principles of operation described herein.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A terminal device for use in a wireless telecommunications system comprising the terminal device, a source network access node and one or more candidate target network access nodes, wherein the terminal device comprises controller circuitry and transceiver circuitry configured to operate together such that the terminal device is operable to: establish a first measurement of radio channel conditions between the terminal device and a first candidate target access node; determine if the first measurement of radio channel conditions for the first candidate target access node satisfies a first predefined criterion, and if so, transmit to the source network access node an indication that the first measurement of radio channel conditions for the first candidate target network access node satisfies the first predefined criterion; receive and store an indication of first connection information for use by the terminal device for connecting to the first candidate target network access node; establish a second measurement of radio channel conditions between the terminal device and the first candidate target network access node; determine if the second measurement of radio channel conditions satisfies a second predefined criterion, and if so, transmit to the source network access node an indication that the second measurement of radio channel conditions for the first candidate target network access node satisfies the second predefined criterion, wherein the second predefined criterion is different to the first predefined criterion; receive an indication the terminal device should connect to the first candidate target network access node, and, in response thereto, transmit signalling to the first candidate target network access node using the stored first connection information to initiate a connection to the first candidate target network access node.

Paragraph 2. The terminal device of paragraph 1, wherein the first predefined criterion is satisfied if the first measurement of radio channel conditions indicates a quality characteristic for the radio channel conditions at the time of the first measurement exceeds a first predefined threshold and the second predefined criterion is satisfied if the second measurement of radio channel conditions indicates a quality characteristic for the radio channel conditions at the time of the second measurement exceeds a second predefined threshold.

Paragraph 3. The terminal device of paragraph 2, wherein the first and second predefined criteria are associated with different thresholds for the same quality characteristic.

Paragraph 4. The terminal device of paragraph 2, wherein the first and second predefined criteria are associated with different quality characteristics.

Paragraph 5. The terminal device of any of paragraphs 1 to 4, wherein the terminal device is further configured to: establish a first measurement of radio channel conditions between the terminal device and a second candidate target access node; determine if the first measurement of radio channel conditions for the second candidate target access node satisfies the first predefined criterion, and if so, transmit to the source network access node an indication that the first measurement of radio channel conditions for the second candidate target network access node satisfies the first predefined criterion; receive and store an indication of second connection information for use by the terminal device for connecting to the second candidate target network access node.

Paragraph 6. The terminal device of paragraph 5, wherein the terminal device is configured to simultaneously store the first connection information associated with the first candidate target access node and the second connection information associated with the second candidate target access node.

Paragraph 7. The method of any of paragraphs 1 to 6, wherein the terminal device is configured to discard the stored first connection information so that it does not go on to initiate a connection to the first candidate target network access node using the stored first connection information if one or more of the following conditions is met: (i) the terminal device does not determine the second measurement of radio channel conditions for the first candidate target network access node satisfies the second predefined criterion within a predefined validity period associated with the stored first connection information; (ii) the terminal device connects to a different candidate target network access node after having stored the first connection information; (iii) the terminal device determines a first measurement of radio channel conditions between the terminal device and a second candidate target access node satisfies the first predefined criterion after having stored the first connection information; (iv) the terminal device receives signalling from the source network access node to indicate the terminal device should discard the stored first connection information; (v) the terminal device determines a third measurement of radio channel conditions between the terminal device and the first candidate target access node satisfies a third predefined criterion before the terminal device determines the second measurement of radio channel conditions for the first candidate target network access node satisfies the second predefined criterion.

Paragraph 8. The terminal device of any of paragraphs 1 to 7, wherein the indication that the first measurement of radio channel conditions for the first candidate target network access node satisfies the first predefined criterion and/or the indication that the second measurement of radio channel conditions for the first candidate target network access node satisfies the second predefined criterion comprises at least one of: (i) a radio resource control message; (ii) layer two, L2, signalling, such as a medium access control, MAC, header; (iii) layer one, L1, signalling, such as in association with a scheduling request or other control information.

Paragraph 9. The terminal device of any of paragraphs 1 to 8, wherein the indication the terminal device should connect to the first candidate target network access node comprises as a least one of: (i) an indication of an identifier for the first candidate target network access node; (ii) a radio resource control message; (iii) layer two, L2, signalling, such as a medium access control, MAC, control element; (iv) layer one, L1, signalling, such as a physical downlink control channel, PDCCH, order.

Paragraph 10. The terminal device of any of paragraphs 1 to 9, wherein the indication of first connection information for use by the terminal device for connecting to the first candidate target network access node comprises an early handover command for the first candidate target network access node.

Paragraph 11. Circuitry for a terminal device for use in a wireless telecommunications system comprising the terminal device, a source network access node and one or more candidate target network access nodes, wherein the circuitry comprises controller circuitry and transceiver circuitry configured to operate together such that the circuitry is operable to: establish a first measurement of radio channel conditions between the terminal device and a first candidate target access node; determine if the first measurement of radio channel conditions for the first candidate target access node satisfies a first predefined criterion, and if so, transmit to the source network access node an indication that the first measurement of radio channel conditions for the first candidate target network access node satisfies the first predefined criterion; receive and store an indication of first connection information for use by the terminal device for connecting to the first candidate target network access node; establish a second measurement of radio channel conditions between the terminal device and the first candidate target network access node; determine if the second measurement of radio channel conditions satisfies a second predefined criterion, and if so, transmit to the source network access node an indication that the second measurement of radio channel conditions for the first candidate target network access node satisfies the second predefined criterion, wherein the second predefined criterion is different to the first predefined criterion; receive an indication the terminal device should connect to the first candidate target network access node, and, in response thereto, transmit signalling to the first candidate target network access node using the stored first connection information to initiate a connection to the first candidate target network access node.

Paragraph 12. A method of operating a terminal device in a wireless telecommunications system comprising the terminal device, a source network access node and one or more candidate target network access nodes, wherein the method comprises: establishing a first measurement of radio channel conditions between the terminal device and a first candidate target access node; determining if the first measurement of radio channel conditions for the first candidate target access node satisfies a first predefined criterion, and if so, transmitting to the source network access node an indication that the first measurement of radio channel conditions for the first candidate target network access node satisfies the first predefined criterion; receiving and storing an indication of first connection information for use by the terminal device for connecting to the first candidate target network access node; establishing a second measurement of radio channel conditions between the terminal device and the first candidate target network access node; determining if the second measurement of radio channel conditions satisfies a second predefined criterion, and if so, transmitting to the source network access node an indication that the second measurement of radio channel conditions for the first candidate target network access node satisfies the second predefined criterion, wherein the second predefined criterion is different to the first predefined criterion; receiving an indication the terminal device should connect to the first candidate target network access node, and, in response thereto, transmitting signalling to the first candidate target network access node using the stored first connection information to initiate a connection to the first candidate target network access node.

Paragraph 13. A terminal device for use in a wireless telecommunications system comprising the terminal device, a source network access node and one or more candidate target network access nodes, wherein the terminal device comprises controller circuitry and transceiver circuitry configured to operate together such that the terminal device is operable to: establish a first measurement of radio channel conditions between the terminal device and a first candidate target access node; determine if the first measurement of radio channel conditions for the first candidate target access node satisfies a first predefined criterion, and if so, transmit to the source network access node an indication that the first measurement of radio channel conditions for the first candidate target network access node satisfies the first predefined criterion; receive and store an indication of first connection information for use by the terminal device for connecting to the first candidate target network access node; establish a further measurement of radio channel conditions between the terminal device and the first candidate target network access node; determine if the further measurement of radio channel conditions satisfies a further predefined criterion, and if so, discard the first connection information.

Paragraph 14. The terminal device of paragraph 13, wherein the further predefined criterion is satisfied if the further measurement of radio channel conditions indicates a quality characteristic for the radio channel conditions at the time of the further measurement fails to exceed a predefined threshold.

Paragraph 15. Circuitry for a terminal device for use in a wireless telecommunications system comprising the terminal device, a source network access node and one or more candidate target network access nodes, wherein the circuitry comprises controller circuitry and transceiver circuitry configured to operate together such that the circuitry is operable to: establish a first measurement of radio channel conditions between the terminal device and a first candidate target access node; determine if the first measurement of radio channel conditions for the first candidate target access node satisfies a first predefined criterion, and if so, transmit to the source network access node an indication that the first measurement of radio channel conditions for the first candidate target network access node satisfies the first predefined criterion; receive and store an indication of first connection information for use by the terminal device for connecting to the first candidate target network access node; establish a further measurement of radio channel conditions between the terminal device and the first candidate target network access node; determine if the further measurement of radio channel conditions satisfies a further predefined criterion, and if so, discard the first connection information.

Paragraph 16. A method of operating a terminal device in a wireless telecommunications system comprising the terminal device, a source network access node and one or more candidate target network access nodes, wherein the method comprises: establishing a first measurement of radio channel conditions between the terminal device and a first candidate target access node; determining if the first measurement of radio channel conditions for the first candidate target access node satisfies a first predefined criterion, and if so, transmit to the source network access node an indication that the first measurement of radio channel conditions for the first candidate target network access node satisfies the first predefined criterion; receiving and store an indication of first connection information for use by the terminal device for connecting to the first candidate target network access node; establishing a further measurement of radio channel conditions between the terminal device and the first candidate target network access node; determining if the further measurement of radio channel conditions satisfies a further predefined criterion, and if so, discard the first connection information.

Paragraph 17. A source network access node for use in a wireless telecommunications system comprising a terminal device, the source network access node and one or more candidate target network access nodes, wherein the source network access node comprises controller circuitry and transceiver circuitry configured to operate together such that the source network access node is operable to: receive from the terminal device an indication that a first measurement of radio channel conditions for a first candidate target network access node for the terminal device satisfies a first predefined criterion, and in response thereto, to transmit to the terminal device an indication of first connection information for use by the terminal device for connecting to the first candidate target network access node; receive from the terminal device an indication that a second measurement of radio channel conditions for the first candidate target network access node for the terminal device satisfies a second predefined criterion, wherein the second predefined criterion is different to the first predefined criterion; and in response thereto, to transmit to the terminal device an indication the terminal device should proceed to initiate a connection to the first candidate target network access node using the first connection information.

Paragraph 18. Circuitry for a source network access node for use in a wireless telecommunications system comprising a terminal device, the source network access node and one or more candidate target network access nodes, wherein the circuitry comprises controller circuitry and transceiver circuitry configured to operate together such that the circuitry is operable to: receive from the terminal device an indication that a first measurement of radio channel conditions for a first candidate target network access node for the terminal device satisfies a first predefined criterion, and in response thereto, to transmit to the terminal device an indication of first connection information for use by the terminal device for connecting to the first candidate target network access node; receive from the terminal device an indication that a second measurement of radio channel conditions for the first candidate target network access node for the terminal device satisfies a second predefined criterion, wherein the second predefined criterion is different to the first predefined criterion; and in response thereto, to transmit to the terminal device an indication the terminal device should proceed to initiate a connection to the first candidate target network access node using the first connection information.

Paragraph 19. A method of operating a source network access node in a wireless telecommunications system comprising a terminal device, the source network access node and one or more candidate target network access nodes, wherein the method comprises: receiving from the terminal device an indication that a first measurement of radio channel conditions for a first candidate target network access node for the terminal device satisfies a first predefined criterion, and in response thereto, transmitting to the terminal device an indication of first connection information for use by the terminal device for connecting to the first candidate target network access node; receive from the terminal device an indication that a second measurement of radio channel conditions for the first candidate target network access node for the terminal device satisfies a second predefined criterion, wherein the second predefined criterion is different to the first predefined criterion; and in response thereto, transmitting to the terminal device an indication the terminal device should proceed to initiate a connection to the first candidate target network access node using the first connection information.

REFERENCES

[1] Holma H. and Toskala A, "LTE for UMTS OFDMA and SC-FDMA based radio access", John Wiley and Sons, 2009
[2] ETSI TS 136 300 V13.2.0 (2016-01)/3GPP TS 36.300 version 13.2.0 Release 13
[3] "Conditional handover", 3GPP TSG-RAN WG2 NR Ad Hoc Tdoc R2-1700544, Spokane, USA, 17-19 Jan. 2017
[4] "Early Handover solutions", 3GPP TSG-RAN WG2 NR Ad Hoc Tdoc R2-1700142, Spokane, USA, 17-19 Jan. 2017

The invention claimed is:

1. A terminal device for use in a wireless telecommunications system comprising the terminal device, a source network access node and one or more candidate target network access nodes, wherein the terminal device comprises controller circuitry and transceiver circuitry configured to operate together such that the terminal device is operable to:
 establish a first measurement of radio channel conditions between the terminal device and a first candidate target access node;
 determine if the first measurement of radio channel conditions for the first candidate target access node satisfies a first predefined criterion, and if so, transmit to the source network access node an indication that the first measurement of radio channel conditions for the first candidate target network access node satisfies the first predefined criterion, wherein the first predefined criterion is satisfied if the first measurement of radio channel conditions indicates a quality characteristic for the radio channel conditions at the time of the first measurement exceeds a first predefined threshold;
 receive and store an indication of first connection information for use by the terminal device for connecting to the first candidate target network access node;
 establish a second measurement of radio channel conditions between the terminal device and the first candidate target network access node;
 determine if the second measurement of radio channel conditions satisfies a second predefined criterion, and if so, transmit to the source network access node an indication that the second measurement of radio channel conditions for the first candidate target network access node satisfies the second predefined criterion, wherein the second predefined criterion is satisfied if the second measurement of radio channel conditions indicates a quality characteristic for the radio channel conditions at the time of the second measurement exceeds a second predefined threshold, and the second predefined criterion is different from the first predefined criterion;
 receive an indication the terminal device should connect to the first candidate target network access node, and, in response thereto,
 transmit signalling to the first candidate target network access node using the stored first connection information to initiate a connection to the first candidate target network access node.

2. The terminal device of claim 1, wherein the first and second predefined criteria are associated with different thresholds for the same quality characteristic.

3. The terminal device of claim 1, wherein the first and second predefined criteria are associated with different quality characteristics.

4. The terminal device of claim 1, wherein the terminal device is further configured to:
 establish a first measurement of radio channel conditions between the terminal device and a second candidate target access node;
 determine if the first measurement of radio channel conditions for the second candidate target access node satisfies the first predefined criterion, and if so, transmit to the source network access node an indication that the first measurement of radio channel conditions for the second candidate target network access node satisfies the first predefined criterion;
 receive and store an indication of second connection information for use by the terminal device for connecting to the second candidate target network access node.

5. The terminal device of claim 4, wherein the terminal device is configured to simultaneously store the first connection information associated with the first candidate target access node and the second connection information associated with the second candidate target access node.

6. The method of claim 1, wherein the terminal device is configured to discard the stored first connection information so that it does not go on to initiate a connection to the first candidate target network access node using the stored first connection information if one or more of the following conditions is met:
 the terminal device does not determine the second measurement of radio channel conditions for the first candidate target network access node satisfies the second predefined criterion within a predefined validity period associated with the stored first connection information;
 the terminal device connects to a different candidate target network access node after having stored the first connection information;
 the terminal device determines a first measurement of radio channel conditions between the terminal device and a second candidate target access node satisfies the first predefined criterion after having stored the first connection information;
 the terminal device receives signalling from the source network access node to indicate the terminal device should discard the stored first connection information;
 the terminal device determines a third measurement of radio channel conditions between the terminal device and the first candidate target access node satisfies a third predefined criterion before the terminal device determines the second measurement of radio channel conditions for the first candidate target network access node satisfies the second predefined criterion.

7. The terminal device of claim 1, wherein the indication that the first measurement of radio channel conditions for the first candidate target network access node satisfies the first predefined criterion and/or the indication that the second measurement of radio channel conditions for the first candidate target network access node satisfies the second predefined criterion comprises at least one of:
  a radio resource control message;
  layer two, L2, signalling, such as a medium access control, MAC, header;
  layer one, L1, signalling, such as in association with a scheduling request or other control information.

8. The terminal device of claim 1, wherein the indication the terminal device should connect to the first candidate target network access node comprises as a least one of:
  an indication of an identifier for the first candidate target network access node;
  a radio resource control message;
  layer two, L2, signalling, such as a medium access control, MAC, control element;
  layer one, L1, signalling, such as a physical downlink control channel, PDCCH, order.

9. The terminal device of claim 1, wherein the indication of first connection information for use by the terminal device for connecting to the first candidate target network access node comprises an early handover command for the first candidate target network access node.

10. A terminal device for use in a wireless telecommunications system comprising the terminal device, a source network access node and one or more candidate target network access nodes, wherein the terminal device comprises controller circuitry and transceiver circuitry configured to operate together such that the terminal device is operable to:
  establish a first measurement of radio channel conditions between the terminal device and a first candidate target access node;
  determine if the first measurement of radio channel conditions for the first candidate target access node satisfies a first predefined criterion, and if so, transmit to the source network access node an indication that the first measurement of radio channel conditions for the first candidate target network access node satisfies the first predefined criterion;
  receive and store an indication of first connection information for use by the terminal device for connecting to the first candidate target network access node;
  establish a further measurement of radio channel conditions between the terminal device and the first candidate target network access node;
  determine if the further measurement of radio channel conditions satisfies a further predefined criterion, and if so, discard the first connection information, wherein the further predefined criterion is satisfied if the further measurement of radio channel conditions indicates a quality characteristic for the radio channel conditions at the time of the further measurement fails to exceed a predefined threshold.

11. A method performed by a source network access function in a wireless telecommunications system, the wireless telecommunications system comprising a terminal device, a source network access node, and one or more candidate target network access nodes, the method comprising:
  receiving from the terminal device a first indication that a first measurement of radio channel conditions for a first candidate target network access node for the terminal device satisfies a first predefined criterion, wherein the first predefined criterion is satisfied if the first measurement of radio channel conditions indicates a quality characteristic for the radio channel conditions at the time of the first measurement exceeds a first predefined threshold;
  in response to receiving the first indication, transmitting, to the terminal device, an indication of first connection information for use by the terminal device for connecting to the first candidate target network access node;
  receiving from the terminal device a second indication that a second measurement of radio channel conditions for the first candidate target network access node for the terminal device satisfies a second predefined criterion, wherein the second predefined criterion is different from the first predefined criterion, and wherein the second predefined criterion is satisfied if the second measurement of radio channel conditions indicates a quality characteristic for the radio channel conditions at the time the second measurement exceeds a second predefined threshold; and
  in response to receiving the second indication, transmitting to the terminal device an indication the terminal device should proceed to initiate a connection to the first candidate target network access node using the first connection information.

* * * * *